United States Patent
Doorenbos (10) Patent No.: US 8,806,083 B2
(45) Date of Patent: Aug. 12, 2014

(54) IDENTIFICATION ADDRESS CONFIGURATION CIRCUIT AND METHOD WITHOUT USE OF DEDICATED ADDRESS PINS

(75) Inventor: Jerry L. Doorenbos, Tucson, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 1127 days.

(21) Appl. No.: 11/803,465

(22) Filed: May 15, 2007

(65) Prior Publication Data

US 2008/0288662 A1 Nov. 20, 2008

(51) Int. Cl.
*G06F 3/00* (2006.01)
*G06F 13/38* (2006.01)

(52) U.S. Cl.
CPC .................................. *G06F 13/385* (2013.01)
USPC .......................................................... 710/30

(58) Field of Classification Search
None
See application file for complete search history.

(56) References Cited

U.S. PATENT DOCUMENTS

| | | | |
|---|---|---|---|
| 5,959,538 A * | 9/1999 | Schousek | 340/665 |
| 6,629,172 B1 * | 9/2003 | Andersson et al. | 710/104 |
| 2005/0079850 A1 * | 4/2005 | Chen et al. | 455/324 |
| 2005/0216631 A1 * | 9/2005 | Daly et al. | 710/110 |
| 2006/0209929 A1 * | 9/2006 | Durand et al. | 375/147 |
| 2007/0104255 A1 * | 5/2007 | Koppelaar | 375/150 |
| 2007/0250648 A1 * | 10/2007 | Picard et al. | 710/9 |

FOREIGN PATENT DOCUMENTS

EP 1061665 12/2000

* cited by examiner

*Primary Examiner* — Henry Tsai
*Assistant Examiner* — Aurangzeb Hassan
(74) *Attorney, Agent, or Firm* — Alan A. R. Cooper; Frederick J. Telecky, Jr.

(57) ABSTRACT

An identification address of a sensor interface device is configured in response to the order of connection of first (DXP1) and second (DXN1) package pins to electrodes of a sensor (Q0). A sensor signal processing circuit (23) has first and second inputs coupled through the first and second pins to the sensor for converting a parameter sensed by the sensor to a different representation. A current is forced through the first pin to produce either a high or low voltage on the first pin depending on the order of connection of the first and second pins to the electrodes of the sensor. A voltage on the first pin is compared with a reference voltage to produce a comparison signal which is mapped to produce the identification address.

20 Claims, 6 Drawing Sheets

FIG. 6 it the US 8,806,083 B2

IDENTIFICATION ADDRESS CONFIGURATION CIRCUIT AND METHOD WITHOUT USE OF DEDICATED ADDRESS PINS

BACKGROUND OF THE INVENTION

The present invention relates generally to circuits and methods for external configuring of the identification address of a sensor-to-digital-bus interface device without providing dedicated identification address configuration pins on a package containing the interface device.

Communication busses, such as I²C buses, frequently require unique addressing information for each device (such as a sensor interface device) connected to the bus. A device often requires address configurability to ensure that the device is unique in a large number of possible system implementations and/or to allow multiple identical devices to be installed on the same bus in the same system. Providing one or more dedicated address configuration package pins to be connected by conductive "straps" to ground or to the $V_{DD}$ supply voltage is a common way of accomplishing this.

The closest prior art is believed to be the use of the above mentioned conductive "straps" to configure the identification address of a device, such as a sensor interface device which couples a sensor to a digital bus. The way I²C systems operate is that an I²C device which presently is the "master" in charge of the I²C bus can send an address on the bus, and that address will be recognized by an I²C slave device which has a pre-configured "identification address" which matches the "requested address" on the I²C bus. The matching slave device then sends an acknowledge signal on the serial data bus, after which the master device can communicate with that slave device via the I²C bus.

Figure 1:
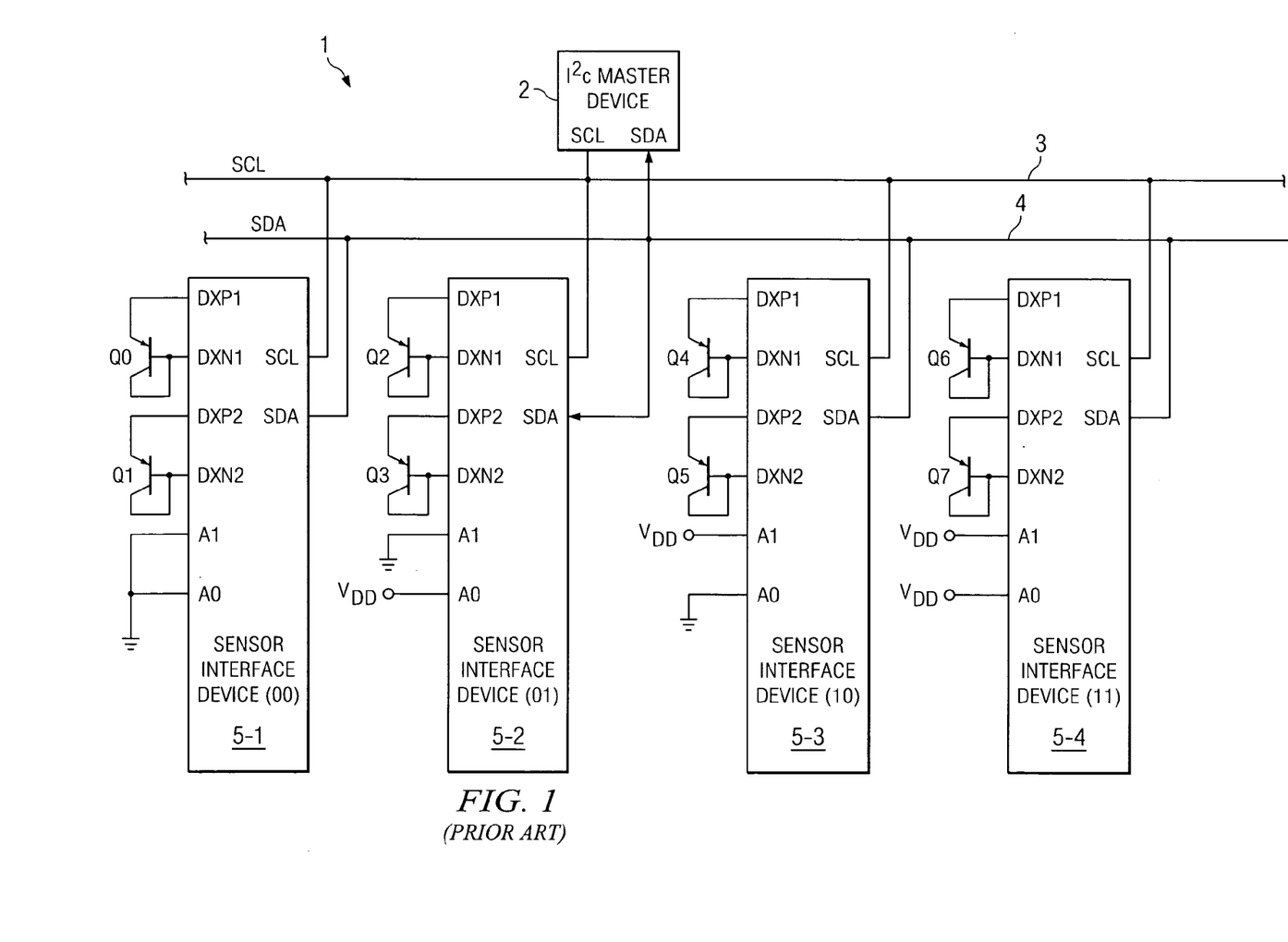
FIG. 1 is a block diagram of an I²C system including conventional sensor interface devices having dedicated identification address configuration pins.

Referring to FIG. 1, I²C system 1 includes an I²C master device 2 having a SCL (serial clock) terminal connected to a SCL bus conductor 3 and a SDA (serial data) terminal connected to a SDA conductor 4. System 1 also includes four sensor interface devices 5-1, 5-2, 5-3 and 5-4 each having a SCL terminal connected to SCL bus conductor 3 and a SDA terminal connected to SDA bus conductor 4. (Any of the sensor interface devices 5-1, 5-2, 5-3 and 5-4 may also be referred to herein simply as "sensor interface device 5".) Each sensor interface device 5 includes 2 terminals DXP1 and DXN1 which can be connected to one external sensor, and also includes 2 more terminals DXP2 and DXN2 which can be connected to another external sensor. Each external sensor in Prior Art FIG. 1 is illustrated as a diode-connected PNP transistor which is utilized to sense ambient temperature (although the external sensor also could be an NPN transistor or other sensor). In sensor interface device 5-1, DXP1 and DXN1 are connected to the emitter and collector-base of temperature-sensing PNP transistor Q0, and similarly, DXP2 and DXN2 are connected to the emitter and collector-base of temperature-sensing PNP transistor Q1. (The collector electrode and base electrode of a diode-connected transistor are collectively referred to herein as the "collector-base," of the transistor.) Temperature-sensing PNP transistors Q2 and Q3 are similarly connected to sensor interface device 5-2, and so forth. The terminals DXP1, DXN1, DXP2 and DXN2 in FIG. 1 are used only for temperature sensing, and play no role in configuration of the device identification addresses.

Each sensor interface device 5 in FIG. 1 also includes two identification address configuration pins A0 and A1. Identification address pins A0 and A1 of sensor interface device 5-1 are connected to ground to configure its identification address as "00". Similarly, identification address pins A0 and A1 of sensor interface device 5-2 are connected to $V_{DD}$ and ground, respectively, to configure its identification address as "01". Address pins A0 and A1 of sensor interface device 5-3 are connected or "strapped" to ground and $V_{DD}$, respectively, to configure its identification address as "10", and address pins A0 and A1 of sensor interface device 5-4 are connected to $V_{DD}$ to configure its identification address as "11". Transistors Q0, Q2, Q4 and Q6 all are connected in exactly the same way to the DXP1 and DXN1 terminals of the various sensor interface devices, and transistors Q1, Q3, Q5 and Q7 all are connected in exactly the same way to the DXP2 and DXN2 terminals of the various sensor interface devices.

The two address configuration pins A0 and A1 of each sensor or face device 5 are internally coupled, either directly or by means of latches, to comparator circuitry which compares the pre-configured device identification address to a requested address provided by master device 2 via the SDA bus. A0 sets the LSB (least significant bit) of the sensor interface device address and A1 sets the next-least-significant bit thereof. Connection of either the A0 pin or the A1 pin to ground represents a "0", and connection of either the A0 pin or the A1 pin to $V_{DD}$ represents a "1".

However, the substantial cost of providing the above described dedicated address configuration pins on the packages of the sensor interface devices is a significant drawback of the prior art techniques.

Thus, there is an unmet need for reducing the cost of configuring the device identification address of sensor interface device for coupling an external sensor to a digital bus.

There also is an unmet need for a circuit and method for configuring a device identification address of a sensor interface device without requiring a dedicated device identification address configuration pin on a package containing the sensor interface device.

There also is an unmet need for a circuit and method for reducing the cost and size of a sensor interface device by reducing the its required number of package pins.

SUMMARY OF THE INVENTION

It is an object of the invention to provide a way reducing the cost of configuring the identification address of a sensor interface device for coupling an external sensor to a digital bus.

It is another object of the invention to provide a circuit and method for configuring a device identification address of a sensor interface device without requiring a dedicated device identification address configuration pin on a package containing the sensor interface device.

It is another object of the invention to provide a circuit and method for reducing the size and cost of a sensor interface device by reducing its required number of package pins.

Briefly described, and in accordance with one embodiment, the present invention provides an identification address of a sensor interface device is configured in response to the order of connection of first (DXP1) and second (DXN1) package pins to electrodes of a sensor (Q0). A sensor signal processing circuit (23) has first and second inputs coupled through the first and second pins to the sensor for converting a parameter sensed by the sensor to a different representation. A current is forced through the first pin to produce either a high or low voltage on the first pin depending on the order of connection of the first and second pins to the electrodes of the sensor. A voltage on the first pin is compared with a reference voltage to produce a comparison signal which is mapped to produce the identification address.

In one embodiment, the invention provides a sensor interface device (15) including a sensor signal processing circuit (23) having first (+) and second (−) inputs coupled through first (DXP1) and second (DXN1) connecting terminals of the sensor interface device (15) to an external first sensor (Q0) for converting a parameter sensed by the first sensor (Q0) to a different representation of the parameter. A comparator (26-1) has a first (+) input coupled to the first connecting terminal (DXP1) and a second (−) input coupled to a first reference voltage ($V_{DD}$−0.5). Identification address configuration circuitry for configuring an identification address of the sensor interface device (15) in response to a way the first sensor (Q0) is connected to the first (DXP1) and second (DXN1) connecting terminals, the identification address configuration circuitry includes current sourcing circuitry (36) for forcing a first current through the first connecting terminal (DXP1), a mapping circuit (30) for mapping an output produced by the comparator (26-1) to produce a device identifying address (ID-ADDR), and a digital comparator (33) for comparing the device identification address (ID-ADDR) with a requested address received from a communication bus (3,4) and indicating whether the device identification address (ID-ADDR) matches the requested address. In one embodiment, the different representation of the parameter is a digital representation. In a described embodiment, the digital comparator (33) sends an acknowledge signal (ACK) to the communication bus (3,4) if the comparing results in a match.

In a described embodiment, the identification address configuration circuitry includes first switching circuitry (S1,S2) for selectively coupling the current sourcing circuitry (36) and the first input of the comparator (26-1) to the first connecting terminal (DXP1).

In a described embodiment, the sensor interface device includes a control circuit (38) operative in response to a power-up signal to cause the first switching circuitry (S1,S2) to connect the current sourcing circuitry (36) and the first input of the comparator (26-1) to the first connecting terminal (DXP1). Second switching circuitry (S3,S4) operates in response to the control circuit (38) to selectively connect the first connecting terminal (DXP1) to the sensor signal processing circuit (23) after the configuring of the identification address of the sensor interface device (15). The first switching circuitry (S1,S2) also selectively couples the second connecting terminal (DXN1) to an internal reference voltage (32) in response to the control circuit (38). In a described embodiment, the mapping circuit (30) is implemented by means of a stored truth table. The first sensor (Q0) can be a NPN transistor or a PNP transistor, a diode-connected transistor, or a resistive sensor, and can be a temperature sensor or a sensor which measures any other physical parameter.

In a described embodiment, the identification address configuration circuitry configures the identification address of the sensor interface device (15) in response to a way a second sensor (Q1) is connected to third (DXP2) and fourth (DXN2) connecting terminals in substantially the same way the identification address configuration circuitry configures in response to the way the first sensor (Q0) is connected to the first (DXP1) and second (DXN1) connecting terminals.

In a described embodiment, the sensor interface device (10-2) includes third (DXP2) and fourth (DXN2) connecting terminals and the identification address configuration circuitry configures the identification address in response to the way the first sensor (Q0), a second sensor (Q1), and a third sensor (Q2) are connected to the first (DXP1), second (DXP2), third (DXP2), and fourth (DXN2) connecting terminals, wherein the first, second, and third sensors are first (Q0), second (Q1), and third (Q2) transistors, respectively, each having a first electrode connected to a same first one of the first (DXP1), second (DXP2), third (DXP2), and fourth (DXN2) connecting terminals. A second electrode of each of the first (Q0), second (Q1), and third (Q2) transistors is connected to a different one of the remaining ones of the first (DXP1), second (DXP2), third (DXP2), and fourth (DXN2) connecting terminals, respectively. The comparator (26-1) produces an output level that is mapped by the mapping circuit (30) to produce the device identifying address (ID-ADDR) only when the current forced through the connecting terminal to which the first electrodes are connected reverse biases emitter-base junctions of the first (Q0), second (Q1), and third (Q2) transistors, whereby the connecting terminal to which all of the first electrodes are connected determines the device identifying address (ID-ADDR).

In another described embodiment, the sensor interface device (10-3) includes third (DXP2) and fourth (DXN2) connecting terminals, and the identification address configuration circuitry configures the identification address in response to the way the first sensor (R0) is connected to the first (DXP1), second (DXP2), third (DXP2) and fourth (DXN2) connecting terminals. The first sensor is a first resistive sensor (R0) having a first electrode connected to the first connecting terminal (DXP1) and a second electrode connected to a one of the second (DXP2), third (DXP2) and fourth (DXN2) connecting terminals which is determined by forcing of the first current (36) through the first connecting terminal (DXP1) while successively connecting the second (DXN1), third (DXP2) and fourth (DXN2) connecting terminals to a second reference voltage (32) to cause the mapping circuit (30) to produce the device identifying address (ID-ADDR) only when the current forced through the first connecting terminal (DXP1) flows through the first resistive sensor (R0) so as to cause a voltage on the first connecting terminal (DXP1) to exceed the first reference voltage ($V_{DD}$−0.5). This causes the mapping circuit (30) to produce the device identifying address (ID-ADDR) so that it corresponds to the connecting terminal to which the second electrode of the first resistive sensor (R0) is connected.

In a described embodiment, the control circuit (38) is operative in response to a re-configure signal subsequent to the power-up signal to cause the first switching circuitry (S1,S2) to connect the current sourcing circuitry (36) and the first input of the comparator (26-1) to the second connecting terminal (DXN1) and to connect the internal reference voltage (32) to the first connecting terminal (DXP1).

In one embodiment, the invention provides the method for configuring an identification address of a sensor interface device (15) in response to an order of connection of first (DXP1) and second (DXN1) connecting terminals to terminals of an external sensor (Q0), including providing a sensor signal processing circuit (23) having first (+) and second (−) inputs coupled through the first (DXP1) and second (DXN1) connecting terminals to the sensor (Q0) for converting a parameter sensed by the sensor (Q0) to a different representation of the parameter, forcing a first current through the first connecting terminal (DXP1) to produce either a high voltage or a low voltage on the first connecting terminal (DXP1) depending on the order of connection of the first (DXP1) and second (DXM1) connecting terminals to the terminals of the sensor (Q0), comparing a voltage on the first connecting terminal (DXP1) with a reference voltage ($V_{DD}$−0.5) to produce a comparison signal (27-1) representative of whether the voltage on the first connecting terminal (DXP1) is high or low, and mapping the comparison signal (27-1) to produce the identification address (ID-ADDR).

In one embodiment, the invention provides circuitry for configuring an identification address of a sensor interface device (15) in response to an order of connection of first (DXP1) and second (DXN1) connecting terminals to terminals of an external sensor (Q0), the circuitry including a sensor signal processing circuit (23) having first (+) and second (−) inputs coupled through the first (DXP1) and second (DXN1) connecting terminals to the sensor (Q0) for converting a parameter sensed by the sensor (Q0) to a different representation of the parameter, means (36) for forcing a first current through the first connecting terminal (DXP1) to produce either a high voltage or a low voltage on the first connecting terminal (DXP1) depending on the order of connection of the first (DXP1) and second (DXM1) connecting terminals to the terminals of the sensor (Q0), means (26-1) for comparing a voltage on the first connecting terminal (DXP1) with a reference voltage ($V_{DD}$−0.5) to produce a comparison signal (27-1) representative of whether the voltage on the first connecting terminal (DXP 1) is high or low, and means (30) for mapping the comparison signal (27-1) to produce the identification address (ID-ADDR).

DETAILED DESCRIPTION OF THE PREFERRED EMBODIMENTS

The present invention allows configuration of an "identification address" of an integrated circuit sensor interface device without the need to provide dedicated identification address configuration pins on an integrated circuit package which contains the sensor interface device.

Figure 2:
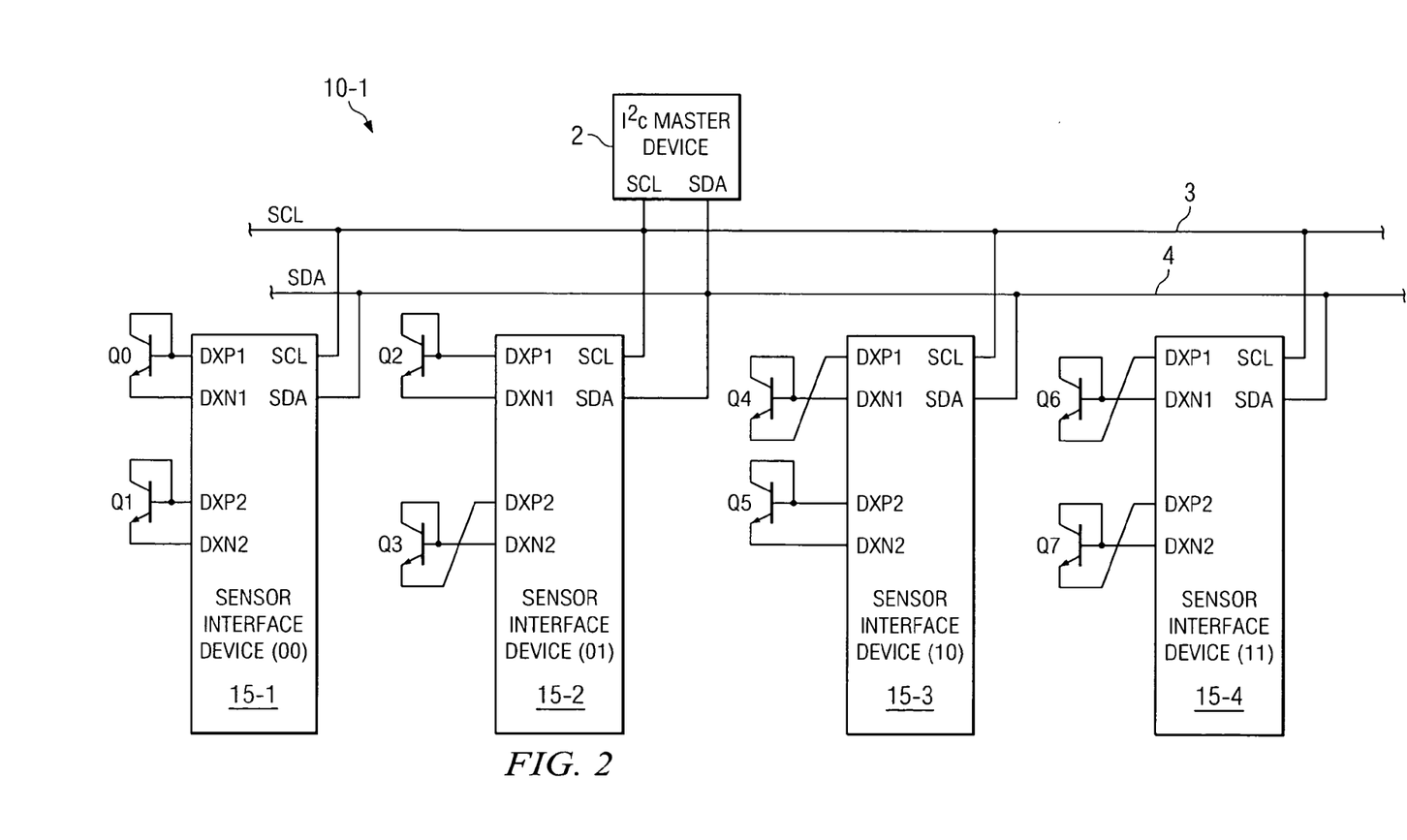
FIG. 2 is a block diagram of an I²C system including sensor interface devices according to the present invention which provide configuration of identification addresses without use of dedicated identification address configuration pins.

Referring to FIG. 2, I²C system 10-1 includes an I²C master device 2 having a SCL terminal connected to a SCL bus conductor 3 and a SDA terminal connected to a SDA conductor 4. (SCL conductor 3 and SDA conductor 4 are collectively referred to as the "I²C bus".) System 10-1 also includes four sensor interface devices 15-1, 15-2, 15-3 and 15-4 each having a SCL terminal connected to SCL bus conductor 3 and a SDA terminal connected to SDA bus conductor 4. (Note that one of sensor interface devices 15-1, 15-2, 15-3 are 15-4 may also be referred to herein simply as "sensor interface device 15".) Each sensor interface device 15 includes 2 terminals DXP1 and DXN1 which can be connected to one external sensor and 2 more terminals DXP2 and DXN2 which can be connected to another external sensor. Each external sensor in FIG. 2 is illustrated as being a diode-connected NPN transistor which is utilized to sense ambient temperature.

It should be appreciated that there is no requirement that the two (or more) sensors be identical, and they could even be dissimilar. In practice, the sensors might be similar in the sense that in many cases they all will be transistors. Such transistors would not necessarily need to be substantially identical. For example, one of the transistors could be NPN while another could be PNP. For PNP transistors, one could be diode-connected while another could have its collector connected to ground. As another example, one sensor could be a discrete transistor and the other could be located on an integrated circuit processor.

Sensor interface devices 15-1, 15-2, 15-3 and 15-4 have unique device identification addresses 00, 01, 10 and 11, respectively, which are established by the order of the connections of the electrodes of the temperature-sensing transistors Q0,1 . . . 7 to the four terminals DXP1, DXN1, DXP2 and DXN2 of the various sensor interface devices 15. This avoids, or at least reduces, the need to use dedicated identification address pins A0, and A1 of Prior Art FIG. 1 to establish the above mentioned device identification addresses. This is a substantial advantage of the present invention.

In sensor interface device 15-1, DXP1 and DXN1 are connected to the collector-base and the emitter, respectively, of NPN transistor Q0. DXP2 and DXN2 are connected to the collector-base and the emitter, respectively of NPN transistor Q1. As subsequently explained, this configures the identification address of sensor interface device 15-1 to be "00". Similarly, in sensor interface device 15-2, DXP1 and DXN1 are connected to the collector-base and the emitter, respectively, of NPN transistor Q2, but DXP2 and DXN2 are connected in the reverse order to the emitter and the collector-base, respectively, of NPN transistor Q3, to configure the identification address of sensor interface device 15-2 to be "01". In sensor interface device 15-3, DXP1 and DXN1 are connected in the reverse order to the emitter and the collector-base, respectively, of NPN transistor Q4, and DXP2 and DXN2 are connected to the collector-base and the emitter, respectively of NPN transistor Q5, to configure the identification address of sensor interface device 15-3 to be "10". Finally, in sensor interface device 15-4, DXP1 and DXN1 are connected in the reverse order to the emitter and the collector-base, respectively, of NPN transistor Q6, and DXP2 and DXN2 are connected in the reverse order to the emitter and collector-base, respectively of NPN transistor Q5 to configure the identification address of sensor interface device 15-4 to be "11".

Briefly, sensor interface devices 15-1,2,3,4 provide the "excitation current" needed to extract the ambient temperature data from the external temperature sensor elements and convert that data to digital form. The order of connection of the sensor electrodes to the DXP1, DXN1, DXP2 and DXN2 pins to each sensor interface device 15 determines its identification addresses, and each sensor interface device provides the excitation current needed to identify the order of connection of the sensor electrodes to the DXP1, DXN1, DXP2 and DXN2 pins in order to internally accomplish the configuration of its identification address.

Figure 3:
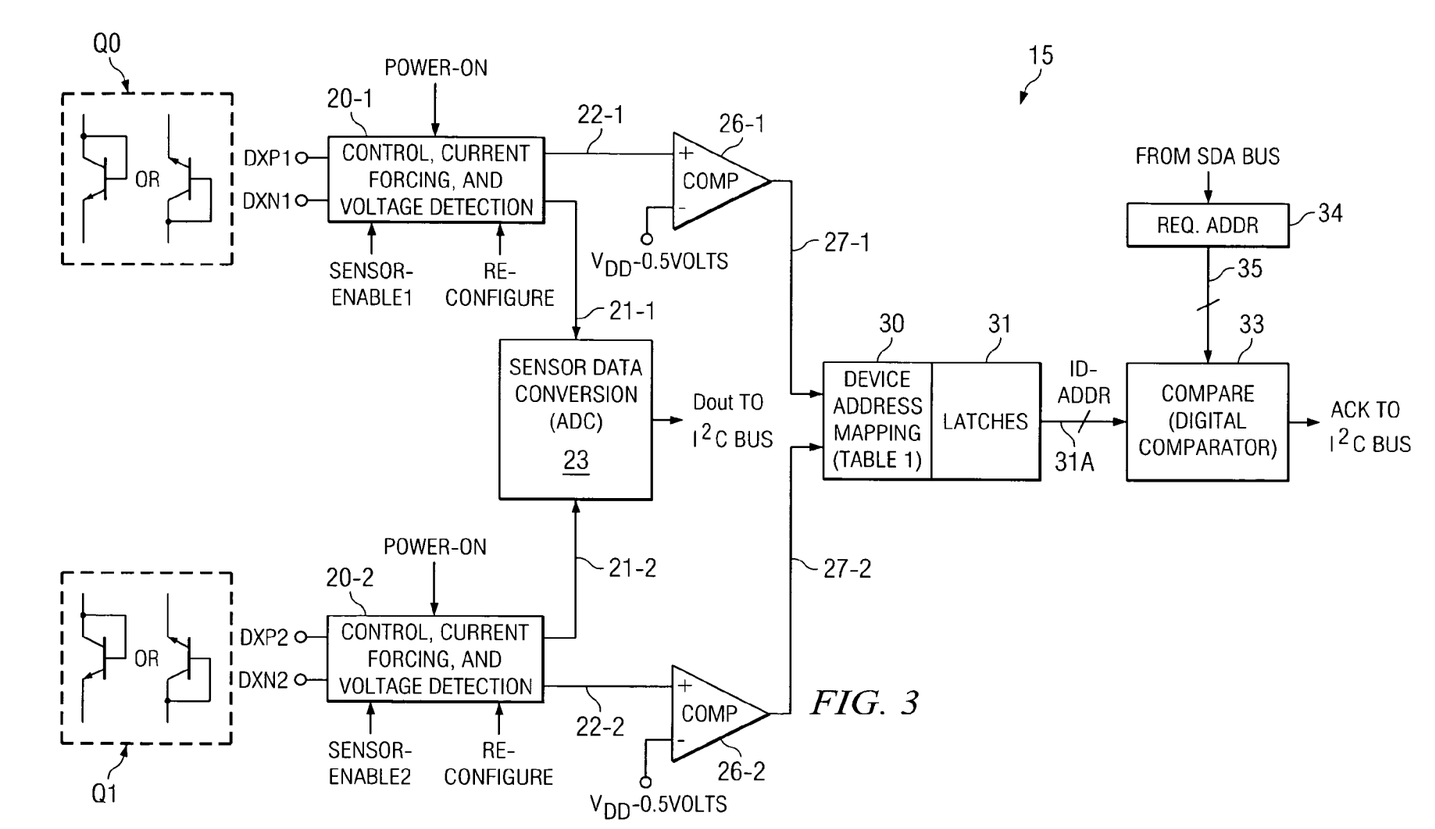
FIG. 3 is a block diagram of a sensor device as shown in FIG. 2.

FIG. 3 shows a block diagram of a basic sensor interface device 15 utilized for each of sensor interface devices 15-1, 2,3,4 in FIG. 2. In FIG. 3, sensor interface device 15 includes control circuitry, current forcing circuitry, and voltage detection circuitry in block 20-1, and also in block 20-2. A signal SENSOR-ENABLE1 causes current forcing circuitry in block 20-1 to establish a current through temperature-sensing transistor Q0, which is illustrated as a diode-connected NPN transistor having either its collector-base electrode connected to DXP1 and its emitter electrode connected to DXN1, or vice versa. Voltage detection circuitry in block 20-1 then causes the voltage developed across transistor Q0 to be provided as an input to sensor data conversion circuit 23, which may include, but does not necessarily include, an analog-to-digital converter (ADC). For example, sensor data conversion circuit 23 does not necessarily need to produce a digital representation of a parameter sensed from sensor transistor Q0, and instead could produce a different analog representation thereof. As an example of this, sensor data conversion circuit 23 could receive a first analog representation of the sensed parameter and then adjust an offset of the first analog representation prior to further analog processing thereof.

Similarly, a signal SENSOR-ENABLE2 causes current forcing circuitry in block 20-2 to establish a current through temperature-sensing transistor Q1, which is illustrated as a diode-connected NPN transistor having either its collector-base electrode connected to DXP2 and its emitter electrode connected to DXN2, or vice versa. Voltage detection circuitry in block 20-2 then causes the voltage developed across transistor Q1 to be provided as another input to sensor data conversion circuit 23. Sensor data conversion circuit 23 then outputs the converted data Dout to SDA bus conductor 4 in FIG. 2.

Control circuitry, current forcing circuitry and voltage detection circuitry in block 20-1 also operate in response to a power-up signal POWER-ON or a subsequent user-provided address identification control signal RE-CONFIGURE to force a predetermined current through transistor Q0 and apply the resulting voltage on terminal DXP1 to the (+) input of comparator 26-1, by means of conductor 22-1. Comparator 26-1 compares the DXP1 voltage on conductor 22-1 with a reference voltage, which can be equal to $V_{DD}$–0.5 volts, and accordingly applies either a "1" or a "0" logic level via conductor 27-1 to the input of a device address mapping circuit 30. Similarly, control circuitry, current forcing circuitry, and voltage detection circuitry in block 20-2 also operate in response to POWER-ON or RE-CONFIGURE to force a predetermined current through transistor Q1 and apply the resulting voltage on terminal DXP2 to the (+) input of comparator 26-2, by means of conductor 22-2. Comparator 26-2 compares the DXP2 voltage on conductor 22-2 with the reference voltage $V_{DD}$–0.5 volts and accordingly generates either a "1" or a "0" logic level on conductor 27-2 and applies it to the input of device address mapping circuit 30.

It should be appreciated that as a practical matter, a single comparator may be used rather than the two illustrated comparators 26-1 and 26-2, with appropriate switches controlled by control circuit 38 to determine which of conductors 22-1 and 22-2 is connected to the (+) of the single comparator.

Address mapping circuit 30 produces a device identification address ID-ADDR, which represents the connection configuration of the electrodes of temperature-sensing transistors Q0 and Q1 to terminals DXP1, DXN2, DXP2, and DXN2. ID-ADDR is stored in latch circuitry 31. Address mapping circuit 30 can be readily implemented as a stored truth table.

A conventional power-on circuit (not shown) produces the above mentioned signal POWER-ON which causes the circuitry in blocks 20-1 and 20-2 of FIG. 3 to initially operate so as to detect how the various temperature-sensing transistors, e.g. Q0 and Q1, are connected to the various sensor interface device terminals DXP1, DXN1, DXP2 and DXN2 to configure the corresponding identification addresses of each of the sensor interface devices 15. However, it should be understood that there is no single mapping relationship that must be used. Any workable truth table or equivalent circuitry can be used to determine the mapping between the sensed order of the terminal connections of the external temperature-sensing elements and the identification addresses established for the sensor interface device. (Subsequently described Table 1, Table 2 and Table 3 show exemplary truth tables for mapping the detected external temperature-sensing-device connections in FIGS. 2, 5 and 6 into corresponding identification addresses ID-ADDR of the various illustrated sensor interface devices.)

A first input of a digital comparator 33 receives ID-ADDR via bus 31A, and also receives a requested address from a digital buffer 34 via a bus 35. The requested address has previously been received from I²C master device 2 (FIG. 2) by digital buffer 35, via SDA bus conductor 4. If digital comparator 33 determines that the requested address matches identification address ID-ADDR of sensor interface device 15, then sensor interface device 15 of FIG. 3 sends an acknowledge signal ACK to I²C master device 2 via SDA bus conductor 4.

However, it should be appreciated that although the sending of an express acknowledge signal in response to the match is required in an I²C system (and also is likely to be required in other typical addressed bus circuits), the sending of an acknowledge signal is not essential in all addressed bus circuits, and is not in general essential to the present invention. Note that if the sensor interface devices described herein are not addressed by the I²C bus, they simply ignore all activity on the I²C bus.

Figure 4:
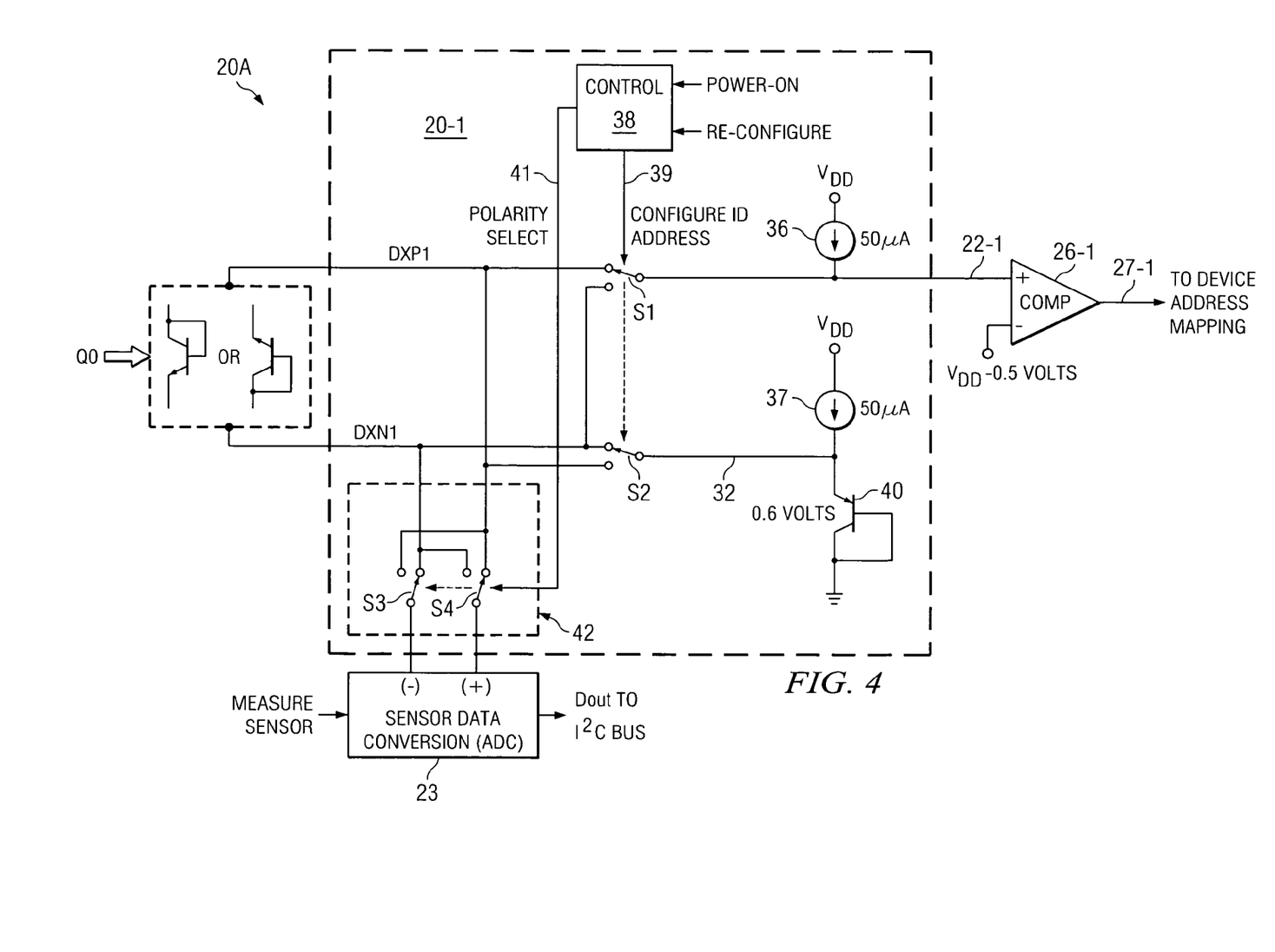
FIG. 4 is a schematic diagram including an address detection circuit included in blocks 20-1 and 20-2 of FIG. 3.

FIG. 4 shows circuitry 20A, including control circuitry, current forcing circuitry, and address detection circuitry that may be included in block 20-1 (and also in block 20-2) of FIG. 3. For convenience, FIG. 4 also shows various connections thereof to temperature-sensing transistor Q0, comparator 26-1, and sensor data conversion circuit 23 shown in FIG. 3.

Referring to FIG. 4, DXP1 is connected to a first terminal of a switch S1 having its pole terminal connected by conductor 22-1 to the (+) input of comparator 26-1. DXP1 also is connected to one input of sensor data conversion circuit 23 and to a second terminal of a switch S2 having its pole terminal connected to a 0.6 volt level generated by forcing a current, for example 50 microamperes, through a diode-connected PNP transistor referenced to ground. Similarly, DXN1 is connected to a first terminal of switch S2 and to the other input of sensor data conversion circuit 23. DXN1 also is connected to a second terminal of switch S1. Conductor 22-1 also is connected to a current source 36 which forces a current, for example 50 microamperes, to flow out of the DXP1 terminal into the electrode of transistor Q0 connected thereto.

It should be appreciated that almost all of the circuitry shown in block 20-1 can be implemented just once and then be shared sequentially between the two sensors by providing the appropriate switching and control circuitry. For example, current sources 36 and 37, PNP transistor 40, and comparator 26-1 can be shared by blocks 20-1 and 20-2. Furthermore, current sources 36 and 37 and PNP transistor 40 can also serve as part of the sensor data conversion circuitry 23.

To configure the identification address of sensor interface device 15 of FIG. 3, control circuit 38 operates in response initially to the signal POWER-ON, or subsequently in response to the signal RE-CONFIGURE, to generate a signal CONFIGURE ID ADDRESS on conductor 39 which causes switch S1 to connect conductor 22-1 to DXP1 and causes switch S2 to connect conductor 32 to DXN1, and at the same time may cause, but does not necessarily cause, switches S3 and S4 to disconnect the (+) and (−) inputs of sensor data conversion circuit 23 from DXP1 and DXN1.

This causes the 50 microampere current of current source 36 to flow out of DXP1 into either the collector-base or the emitter of temperature-sensing transistor Q0, depending on how it is connected to DXP1 and DXN1. DXN1 then is at the 0.6 volt level generated by the current (e.g., 50 microamperes) of current source 37 flowing through diode-connected PNP transistor 40.

It should be appreciated that conductor 32 could alternatively be connected to most any reference voltage that would allow a suitable threshold voltage to be applied to the (−) input of the comparator to allow detection of the difference between reverse-biased and forward biased sensor transistors connected between the DXP1 and DXN1 pins, etc.

It also should be appreciated that sensor data conversion circuit 23 does not necessarily need to be disconnected from the DXP1 or other connecting terminals/pins for the present invention to function properly, but data conversion circuit 23 might need to be disconnected from the DXP1 or other connecting terminals/pins depending on how its characteristics interfere with the other circuitry. (Alternatively, it would be possible to utilize sensor conversion circuitry 23, rather than comparator 26-1, to detect the order of connection of the sensor electrodes to DXP1, DXN1, DXP2 and DXN2, even though this approach would be more complicated.)

It also should be appreciated that in some cases switching circuitry S1,S2 might not be necessary because in those cases conductor 22-1 and DXP1 could be permanently connected. For example, switch S1 might not be necessary if current source 36 could be readily switched on and off as needed.

If the collector-base and emitter of transistor Q0 are connected to DXP1 and DXN1, respectively, then the 50 microm­pere current forced out of DXP1 forward biases the base-emitter junction of transistor Q0, which then clamps DXP1 at approximately 0.6 volts above the 0.6 volt level of DXN1, i.e., at 1.2 volts. This is substantially lower than the potential $V_{DD}$−0.5 volts of the (−) input of comparator 26-1, so it generates a "0" on conductor 27-1. However, if the emitter and collector-base of transistor Q0 are reversed so that they are connected to DXP1 and DXN1, respectively, then the 50 micrompere current forced out of DXP1 reverse biases the base-emitter junction of transistor Q0, which then prevents the 50 microampere current from flowing through transistor Q0 and therefore causes DXP1 to rise to $V_{DD}$ volts, which is substantially greater than the $V_{DD}$−0.5 volts on the (−) input of comparator 26-1. So in this case, comparator 26-1 generates a "1" on conductor 27-1.

The foregoing procedure also occurs in block 20-2 of FIG. 3, causing comparator 26-2 to also generate either a "0" or "1" on conductor 27-2. The logic levels thus produced on conductors 27-1 and 27-2 in FIG. 3 are provided as inputs to device address mapping circuit 30, which then generates the identification address ID-ADDR of sensor interface device 15 and stores it in latches 31. If that identification address ID-ADDR is matched by an address requested via the I²C bus, sensor interface device 15 sends an acknowledge signal ACK back to the I²C master device 2.

The processing by blocks 20-1 and 20-2 would proceed consecutively if the various circuit elements including current sources 36 and 37, PNP transistor 40, and comparator 26-1 are shared as previously described. However, if the various foregoing circuit elements are not shared, i.e., blocks 20-1 and 20-2 are essentially identical and a second comparator 26-2 is utilized, then the processing by blocks 20-1 and 20-2 may occur either consecutively or concurrently.

After the foregoing detection is performed, the roles of DXN1 and DXP1 can be reversed in response to the user-provided signal RE-CONFIGURE to, in effect, re-test the connections of temperature-sensing transistor Q0. This causes the 50 microampere current of current source 36 to be forced out of DXN1 (rather than DXP1) and also causes DXP1 (rather than DXN1) to be at the 0.6 volt level on conductor 32. This operation is accomplished by causing switch S1 to connect conductor 22-1 to DXN1 and by causing switch S2 to connect conductor 32 to DXP1. This reverses the polarity of the voltage between DXP1 and DXN1, and therefore control circuit 38 produces a polarity select signal on conductor 41 which causes switch S3 to connect the (−) input of sensor data conversion circuit 23 to DXP1 and causes switch S4 to connect to the (+) input of sensor data conversion circuit 23 to DXN1. The main reason for providing this "re-testing" or "re-configuring" capability is provided is to help determine whether there is a defective connection to temperature-sensing transistor Q0.

In case there is a defective connection, the I²C master device 2 can provide various choices to the user if the defective connection is indicated by device address mapping circuit 30. The subsequently described truth tables in Table 1, Table 2, and Table 3 show all possible output combinations from the comparator(s), including the erroneous output combinations. The erroneous output combinations shown in the truth tables may be mapped to a default address to enable the error-causing conditions be appropriately managed by a system processor.

The operation of forcing current (e.g., 50 microamperes) on one electrode of the external sensor connection and a reference voltage (e.g., 0.6 volts) on the other electrode produces a resulting voltage drop which is large if the PN junction of the temperature-sensing transistor is reversed biased or open or is small if the PN junction is forward biased. After swapping the voltage and current source and then making repeating the same procedure, there are four possible results: open/open, open/diode(short), diode(short)/open, or diode (short)/diode(short). The open/diode case could be used to select one address (or group of addresses) and the diode/open case could be used to select a second address (or group of addresses). The open/open and diode/diode cases are likely to indicate application errors and should be handled accordingly. For example, the error cases could be used to select either an address not in the normal group or a preferred address (or group of addresses) from a "valid" list. Also, the diode/diode case could possibly be used to select a third address (or group of addresses.)

Table 1 shows a truth table that can be used in address mapping circuit 30 of the sensor interface devices when used as shown in FIG. 2.

TABLE 1

| Compare DXP1 | Compare DXN1 | Compare DXP2 | Compare DXN2 | Address | Error? |
|---|---|---|---|---|---|
| 0 | 0 | 0 | 0 | 00 | yes |
| 0 | 0 | 0 | 1 | 00 | yes |
| 0 | 0 | 1 | 0 | 01 | yes |
| 0 | 0 | 1 | 1 | 00 | yes |
| 0 | 1 | 0 | 0 | 00 | yes |
| 0 | 1 | 0 | 1 | 00 | no |
| 0 | 1 | 1 | 0 | 01 | no |
| 0 | 1 | 1 | 1 | 00 | yes |
| 1 | 0 | 0 | 0 | 10 | yes |
| 1 | 0 | 0 | 1 | 10 | no |
| 1 | 0 | 1 | 0 | 11 | no |
| 1 | 0 | 1 | 1 | 10 | yes |
| 1 | 1 | 0 | 0 | 00 | yes |
| 1 | 1 | 0 | 1 | 00 | yes |
| 1 | 1 | 1 | 0 | 01 | yes |
| 1 | 1 | 1 | 1 | 00 | yes |

The column heading "Compare DXP1" in the truth tables means that the "forcing" current source 36 and comparator 26-1 were electrically connected to DXP1 and that the 0.6 volt reference voltage produced on conductor 32 by current source 37 and PNP transistor 40 in FIG. 4 was electrically connected to DXN1 to generate the identification address indicated in the "Address" column. The corresponding entries in the "Error?" column indicate "no" if the determination of the identification address was correct, and indicate by "yes" that the determination was erroneous because it was based on an impossible response to the DXP1, DXN1, DXP2 and DXN2 conditions indicated in the same row of the first four columns of the truth table. Similarly, the column heading "Compare DXN1" means that the "forcing" current source 36 and comparator 26-1 were electrically connected to DXN1 and the 0.6 volt reference voltage on conductor 32 in FIG. 4 was electrically connected to DXP1 to generate the identification address indicated in the "Address" column. The third and fourth column headings have analogous meanings with respect to DXP2 and DXN2.

In the "Address" column, the four "no" entries indicate that there were no errors, meaning that the measurements resulting in the "00", "01", "10" and "11" addresses were correct under the circumstances indicated in the same line first four columns of Table 1. All of the other results represent errors, and when those errors occur it means the results in the "Address" column should not have been generated under the circumstances indicated in the same line of the first four columns of Table 1. For example, in the first row, the first four columns do not show logic levels of DXP1, DXN1, DXP2 and DXN2 that should have resulted in the mapped identification address shown in the "Address" column for any of the sensor transistor configurations shown in FIG. 2. Typically, each erroneous result would be dealt with by accessing an error processing routine in an external system processor.

Figure 5:
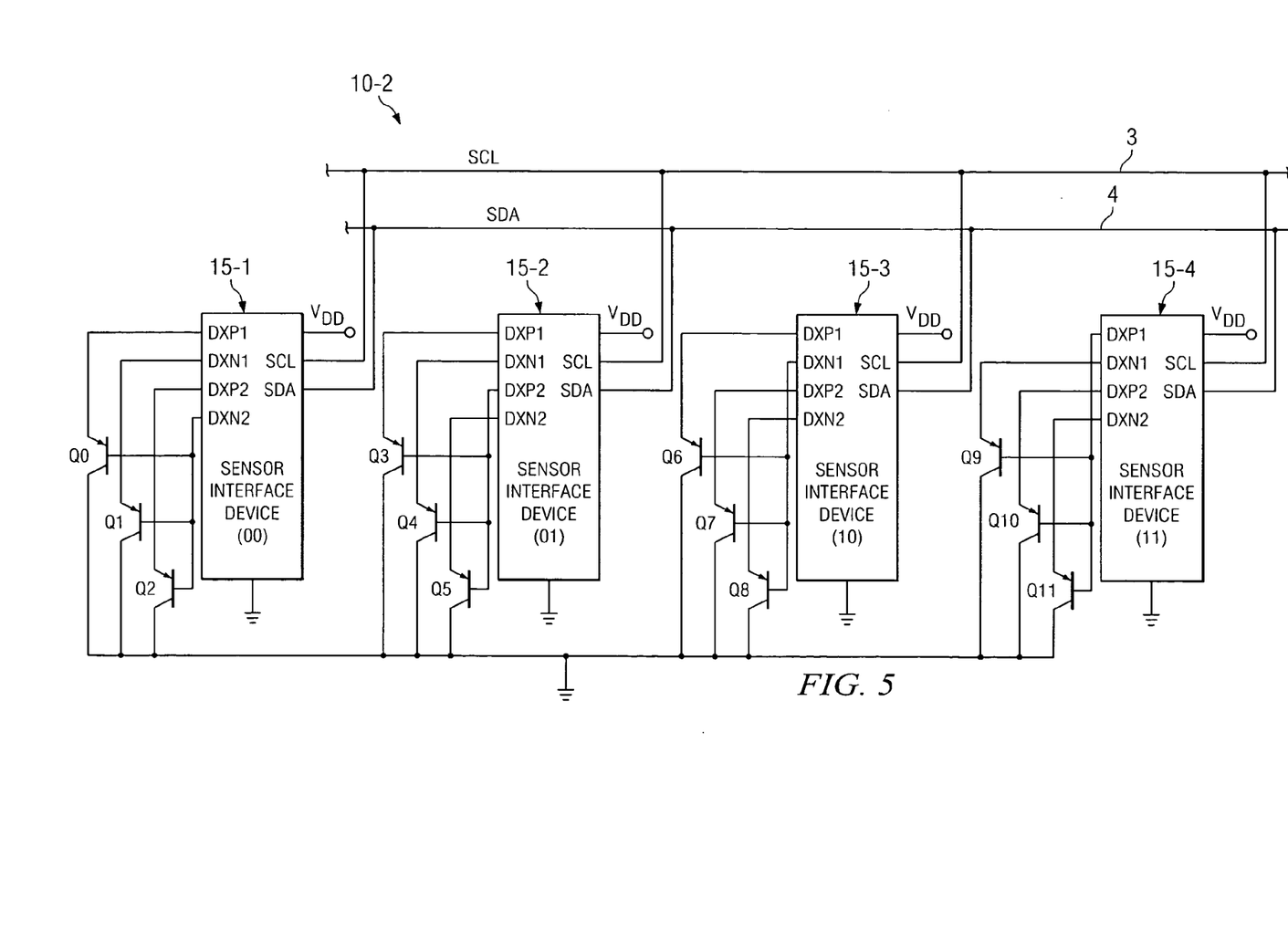
FIG. 5 is a block diagram of another embodiment of the present invention wherein three transistors functioning as temperature sensors are connected to each sensor device.

Referring next to FIG. 5, three, rather than two, transistors are connected to each of sensor interface devices 15-1, 15-2, 15-3 and 15-4. For example, PNP transistors Q0, Q1, and Q2 are connected to sensor interface device 15-1 in I²C 10-2. The emitters of transistors Q0, Q1, and Q2 are connected to DXP1, DXN1, and DXP2, respectively. The bases of transistors Q0, Q1, and Q2 are connected to DXN2, and their collectors all are connected to ground. Similarly, PNP transistors Q3, Q4, and Q5 are connected to sensor interface device 15-2. The emitters of transistors Q3, Q4, and Q5 are connected to DXP1, DXN1, and DXN2, respectively. The bases of transistors Q3, Q4, and Q5 are connected to DXP2, and their collectors all are connected to ground. PNP transistors Q6, Q7, and Q8 are connected to sensor interface device 15-3. The emitters of transistors Q6, Q7, and Q8 are connected to DXP1, DXP2, and DXN2, respectively. The bases of transistors Q6, Q7, and Q8 are connected to DXN1, and their collectors all are connected to ground. Finally, PNP transistors Q9, Q10, and Q11 are connected to sensor interface device 15-4. The emitters of transistors Q9, Q10, and Q11 are connected to DXN1, DXP2, and DXN2, respectively. The bases of transistors Q9, Q10, and Q11 are connected to DXP1, and their collectors all are connected to ground. For the arrangement shown in FIG. 5, a single comparator, e.g. comparator 26-1 in FIG. 4, would be used (rather than both of the illustrated comparators 26-1 and 26-2), with appropriate switches (not shown) controlled by control circuit 38 being operated to sequentially connect each one of DXP1, DXN1, DXP2 and DXN2 to the (+) input of the single comparator while simultaneously connecting the remaining three terminals to the 0.6 volt level on conductor 32 in FIG. 4.

The procedure for configuring the device identification addresses for each of four sensor interface devices 15-1, 15-2, 15-3 and 15-4 in FIG. 5 is as follows. First, the 50 μA current from current source 36 is forced out of DXP1 while DXN1, DXP2 and DXN2 are connected to the 0.6 volt level on conductor 32. Second, the 50 μA current from current source 36 is forced out of DXN2 while DXP1, DXP2 and DXN2 are connected to the 0.6 volt level on conductor 32. Third, the 50 μA current from current source 36 is forced out of DXP2 while DXP1, DXN1 and DXN2 are connected to the 0.6 volt level on conductor 32. Finally, the 50 μA current from current source 36 is forced out of DXN2 while DXP1, DXN1 and DXP2 are connected to the 0.6 volt level on conductor 32. In each case, the pin out of which the 50 microampere current is forced goes to $V_{DD}$ only if that pin is the one connected to the bases of all three of the transistors. If that happens the output of comparator 26-1 generates a "1", but otherwise comparator 26-1 generates a "0" because the pin out of which the 50 microampere is forced forward biases the emitter-base junction of the single transistor to which it is connected and therefore causes that pin to be clamped to approximately 1.2 volts. Thus, the information as to which of the four connecting terminals/pins DXP1, DXN1, DXP2, or DXN2 is connected to the bases of all three sensor transistors Q0, Q1, and Q2 is what establishes which of the four transistor connection configurations shown in FIG. 5 is present and therefore identifies which of the four identification address configurations 00, 01, 10, and 11 is applicable. (Note that the order of the emitter connections of transistors Q0, Q1, and Q2 does not affect which of the foregoing identification address configurations is applicable.)

Table 2 shows a truth table that can be used in address mapping circuit 30 of the sensor interface devices when used as shown in FIG. 5.

TABLE 2

| Compare DXP1 | Compare DXN1 | Compare DXP2 | Compare DXN2 | Address | Error? |
|---|---|---|---|---|---|
| 0 | 0 | 0 | 0 | 00 | yes |
| 0 | 0 | 0 | 1 | 00 | no |
| 0 | 0 | 1 | 0 | 01 | no |
| 0 | 0 | 1 | 1 | 00 | yes |
| 0 | 1 | 0 | 0 | 10 | no |
| 0 | 1 | 0 | 1 | 00 | yes |
| 0 | 1 | 1 | 0 | 00 | yes |
| 0 | 1 | 1 | 1 | 00 | yes |
| 1 | 0 | 0 | 0 | 11 | no |
| 1 | 0 | 0 | 1 | 10 | yes |
| 1 | 0 | 1 | 0 | 00 | yes |
| 1 | 0 | 1 | 1 | 00 | yes |
| 1 | 1 | 0 | 0 | 00 | yes |
| 1 | 1 | 0 | 1 | 00 | yes |
| 1 | 1 | 1 | 0 | 00 | yes |
| 1 | 1 | 1 | 1 | 00 | yes |

The column headings in Table 2 refer to forcing current and connecting the comparator to DXP1 while DXN1, DXP2, DXN2 are simultaneously connected to the 0.6 volt reference. Also, with a substantial increase in entries in the truth table, these could all be checked sequentially (DXP1-DXN1, DXP1-DNP2, DXP1-DXN2) as well. "Compare DXP2" means force current and connect the comparator to DXP2 while connecting DXP1, DXP2, DXN2 to 0.6 volt. "Compare DXP3" means force current on DXN1 while the remaining terminals are connected to 0.6 volts. "Compare DXP4" means force current on DXN2 while the remaining terminals connect to 0.6 volts. Note that this method can be applied to only three terminals and two sensors, in which case the truth table is same as above except all rows where "Compare DXN2" is "1" are eliminated and the "Compare DXN2" column is eliminated.

Figure 6:
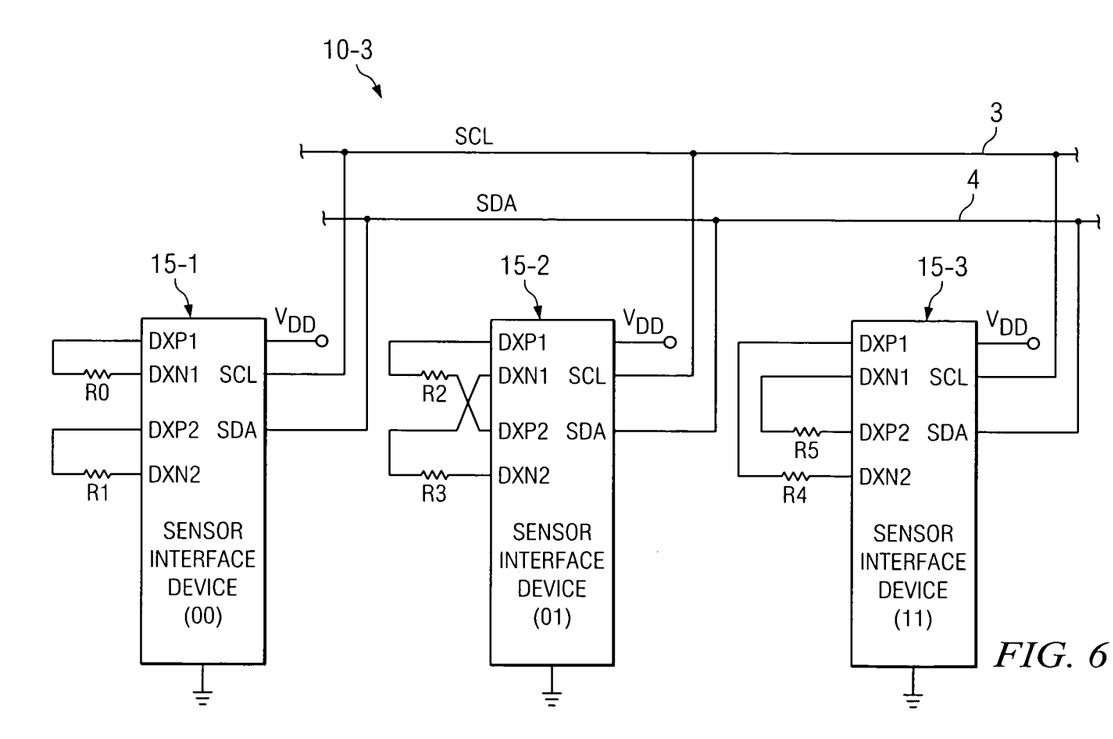
FIG. 6 is a block diagram of another embodiment of the present invention wherein two resistive temperature sensors are connected to each sensor device.

In FIG. 6, two resistive sensors, such as thermocouples, thermistors, or RTDs (resistance temperature device), are connected to each of three sensor interface devices 15-1, 15-2 and 15-3. In FIG. 6, I²C system 10-3 includes two resistive sensors coupled to each of sensor interface devices 15-1, 15-2, and 15-3, respectively. For example, thermocouple R0 is coupled between DXP1 and DXN1 and thermocouple R1 is coupled between DXP2 and DXN2. Similarly, thermocouple R2 is coupled between DXP1 and DXP2 and thermocouple R3 is coupled between DXN1 and DXN2. Finally, thermocouple R4 is coupled between DXP1 and DXN2 and thermocouple R5 is coupled between DXN1 and DXP2.

The procedure for configuring the device identification addresses for each of three sensor interface devices 15-1, 15-2 and 15-3 in FIG. 6 is as follows. First, the 50 µA current from current source 36 is forced out of DXP1 while DXN1 is connected to the 0.6 volt level on conductor 32. Second, the 50 µA current from current source 36 is forced out of DXP1 while DXP2 is connected to the 0.6 volt level on conductor 32. Third, the 50 µA current from current source 36 is forced out of DXP1 while DXN2 is connected to the 0.6 volt level on conductor 32.

In each of the foregoing steps, a 50 microampere current is forced out of DXP1 from current source 36 and into a first terminal of a first resistive sensor, and therefore also flows out of a second terminal of the first resistive sensor to one of the three remaining pins DXN1, DXP2 and DXN2 if the second terminal of the first resistive sensor is connected to 0.6 volts so as to cause a low voltage on DXP1, and to thereby cause a "0" to be produced at the output of comparator 26-1. That information identifies which of pins DXN1, DXP2 and DXN2 is connected to the second terminal of the first resistive sensor. Consequently, the electrode connections of the first resistive sensor are known, and since there are only 4 pins of each sensor interface device 15 available for connection to external sensors, the terminal connections of the second resistive sensor also are known. Consequently, the three comparator output logic levels resulting from the three steps of the foregoing procedure identify which of the identification addresses 00, 01 or 10 is the appropriate device address for the sensor interface device.

Table 3 shows a truth table that can be used in the address mapping circuit 30 of the sensor interface devices as shown in FIG. 6.

TABLE 3

| Compare DXP1/DXN1 | Compare DXP1/DXP2 | Compare DXP1/DXN2 | Address | Error? |
|---|---|---|---|---|
| 0 | 0 | 0 | 00 | yes |
| 0 | 0 | 1 | 00 | yes |
| 0 | 1 | 0 | 00 | yes |
| 0 | 1 | 1 | 00 | no |
| 1 | 0 | 0 | 00 | yes |
| 1 | 0 | 1 | 01 | no |
| 1 | 1 | 0 | 10 | no |
| 1 | 1 | 1 | 00 | yes |

The column heading "Compare DXP1/DXN1" in Table 3 means that the "forcing" current source 36 and comparator 26-1 were electrically connected to DXP1 and that the 0.6 volt reference voltage produced on conductor 32 by current source 37 and PNP transistor 40 in FIG. 4 was electrically connected to DXN1 to generate the identification address indicated in the "Address" column. The column heading "Compare DXP1/DXP2" means that the "forcing" current source 36 and comparator 26-1 were electrically connected to DXP1 and the 0.6 volt reference voltage on conductor 32 in FIG. 4 was electrically connected to DXP2 to generate the identification address indicated in the "Address" column. Similarly, the column heading "Compare DXP1/DXN2" means that the "forcing" current source 36 and comparator 26-1 were electrically connected to DXP1 and the 0.6 volt reference voltage on conductor 32 in FIG. 4 was electrically connected to DXN2 to generate the identification address indicated in the "Address" column.

It should be noted that only three identification addresses can be configured on the basis of the connections of two "un-polarized" sensors, such as thermocouples, which do not have an associated polarity, whereas four identification addresses can be configured on the basis of connections of two sensors, such as transistors, which do have an associated polarity.

The present invention allows end user configurability of device identification addresses for sensor interface devices without requiring that dedicated identification address configuration pins be provided on the of the sensor interface device package.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention.

For example, the transistors Q0,1 ... 7 in FIG. 2 are shown as PNP transistors, although they could just as well be NPN transistors. For NPN transistors, the collector and base should always be connected together. For PNP transistors, the collectors could be connected to ground. The concept of the invention can, of course, be applied in other applications than $I^2C$ devices. The procedure of the present invention can, of course, be utilized to provide as many sensor interface device address configuration bits as desired. And, of course, the present invention can be used in conjunction with use of dedicated identification address configuration pins. Although temperature sensors are described, the invention is equally applicable to sensors which measure physical parameters other than temperature.

What is claimed is:
1. An apparatus comprising:
a first sensor terminal;
a second sensor terminal;
a switch network that is coupled to the first and second sensor terminals;
a controller that is coupled to the switch network so as to control the switch network;
a first current source that is coupled to the switch network;
a second current source that is coupled to the switch network;
processing circuit that is coupled to the switch network, wherein the processing circuitry receives a sensor measurement through the first and second sensor terminals, and wherein the processing circuit is adapted to provide a representation of the sensor measurement over an inter-integrated circuit ($I^2C$) bus;
a first comparator having a first input terminal, a second input terminal, and an output terminal, wherein the first input terminal of the first comparator is coupled to the first current source and the switch network, and wherein the second input terminal of the first comparator receives a reference voltage;
mapping circuitry that is coupled to the output terminal of the first comparator and that generates a device identifying address; and a second comparator that is coupled to the mapping circuitry, wherein the second comparator indicates whether the device identifying address matches a requested address.

2. The apparatus of claim 1, wherein the switch network further comprises:
  a first switch that is coupled to the processing circuitry, the first sensor terminal, the second sensor terminal, wherein the controller couples the first sensor terminal to the processing circuitry in a first polarity state, and wherein the controller couples the second sensor terminal to the processing circuitry in a second polarity state;
  a second switch that is coupled to the processing circuitry, the first sensor terminal, the second sensor terminal, wherein the controller couples the second sensor terminal to the processing circuitry in the first polarity state, and wherein the controller couples the first sensor terminal to the processing circuitry in the second polarity state;
  a third switch that is coupled to the first current source, the first sensor terminal, the second sensor terminal, wherein the controller couples the first current source to the first sensor terminal in a first configuration state, and wherein the controller couples the first current source to the second sensor terminal in a second configuration state; and
  a fourth switch that is coupled to the second current source, the first sensor terminal, the second sensor terminal, and the controller, wherein the controller couples the second current source to the second sensor terminal in the first configuration state, and wherein the controller couples the second current source to the first sensor terminal in the second configuration state.

3. The apparatus of claim 2, wherein the apparatus further comprises a diode that is coupled between the second current source and ground.

4. The apparatus of claim 3, wherein the diode is a diode-connected transistor.

5. The apparatus of claim 3, wherein the apparatus further comprises latching circuitry that is coupled between the mapping circuitry and the second comparator.

6. The apparatus of claim 5, wherein the second comparator is a digital comparator.

7. The apparatus of claim 6, wherein the processing circuitry further comprises an analog-to-digital converter (ADC).

8. An apparatus comprising:
  a plurality of sensor terminal pairs, wherein each sensor terminal pair includes a first sensor terminal and a second sensor terminal;
  a plurality of input circuits, wherein each input circuit is coupled to at least one of the sensor terminal pairs, and wherein each input circuit includes:
    a switch network that is coupled to the first and second sensor terminals of its sensor terminal pair;
    a controller that is coupled to the switch network so as to control the switch network;
    a first current source that is coupled to the switch network; and
    a second current source that is coupled to the switch network;
      processing circuit that is coupled to the switch network from each input circuit, wherein the processing circuitry receives sensor measurements through the sensor terminal pairs, and wherein the processing circuit is adapted to provide representations of the sensor measurements over an I²C bus;

a set of comparators, wherein each comparator from the set of comparators includes a first input terminal, a second input terminal, and an output terminal, wherein the first input terminal of each comparator from the set of comparators is coupled to the first current source and the switch network from at least one of the input circuits, and wherein the second input terminal of each comparator from the set of comparators receives a reference voltage;
  mapping circuitry that is coupled to the output terminal of each comparator from the set of comparators and that generates a device identifying address; and
  a digital comparator that is coupled to the mapping circuitry, wherein the digital comparator indicates whether the device identifying address matches a requested address.

9. The apparatus of claim 8, wherein each switch network further comprises:
  a first switch that is coupled to the processing circuitry, its first sensor terminal, its second sensor terminal, wherein its controller couples its first sensor terminal to the processing circuitry in a first polarity state, and wherein its controller couples its second sensor terminal to the processing circuitry in a second polarity state;
  a second switch that is coupled to the processing circuitry, its first sensor terminal, its second sensor terminal, wherein its controller couples its second sensor terminal to the processing circuitry in the first polarity state, and wherein its controller couples its first sensor terminal to the processing circuitry in the second polarity state;
  a third switch that is coupled to its first current source, its first sensor terminal, its second sensor terminal, wherein its controller couples its first current source to its first sensor terminal in a first configuration state, and wherein its controller couples its first current source to its second sensor terminal in a second configuration state; and
  a fourth switch that is coupled to its second current source, its first sensor terminal, its second sensor terminal, and its controller, wherein its controller couples its second current source to its second sensor terminal in the first configuration state, and wherein its controller couples its second current source to its first sensor terminal in the second configuration state.

10. The apparatus of claim 9, wherein the each input circuit further comprises a diode that is coupled between the second current source and ground.

11. The apparatus of claim 10, wherein the diode is a diode-connected transistor.

12. The apparatus of claim 10, wherein the apparatus further comprises latching circuitry that is coupled between the mapping circuitry and the digital comparator.

13. The apparatus of claim 12, wherein the processing circuitry further comprises an ADC.

14. An apparatus comprising:
  an I²C master device;
  an I²C bus that is coupled to the I²C master device;
  a plurality of sensor interface devices, wherein each sensor interface device includes:
    a plurality of sensor terminal pairs, wherein each sensor terminal pair includes a first sensor terminal and a second sensor terminal;
    a plurality of input circuits, wherein each input circuit is coupled to at least one of the sensor terminal pairs, and wherein each input circuit includes:
      a switch network that is coupled to the first and second sensor terminals of its sensor terminal pair;

a controller that is coupled to the switch network so as to control the switch network;
a first current source that is coupled to the switch network; and
a second current source that is coupled to the switch network;
processing circuit that is coupled to the switch network from each input circuit and the I²C bus, wherein the processing circuitry receives sensor measurements through the sensor terminal pairs, and wherein the processing circuit is adapted to provide representations of the sensor measurements over the I²C bus;
a set of comparators, wherein each comparator from the set of comparators includes a first input terminal, a second input terminal, and an output terminal, wherein the first input terminal of each comparator from the set of comparators is coupled to the first current source and the switch network from at least one of the input circuits, and wherein the second input terminal of each comparator from the set of comparators receives a reference voltage;
mapping circuitry that is coupled to the output terminal of each comparator from the set of comparators and that generates a device identifying address;
address request circuitry that is coupled to the I²C bus; and
a digital comparator that is coupled to the mapping circuitry, the address request circuitry, and the I²C bus, wherein the digital comparator indicates whether the device identifying address matches a requested address over the I²C bus; and
a plurality of sensors, wherein each sensor is coupled across at least one of the sensor terminal pairs.

15. The apparatus of claim 14, wherein each switch network further comprises:
a first switch that is coupled to the processing circuitry, its first sensor terminal, its second sensor terminal, wherein its controller couples its first sensor terminal to the processing circuitry in a first polarity state, and wherein its controller couples its second sensor terminal to the processing circuitry in a second polarity state;
a second switch that is coupled to the processing circuitry, its first sensor terminal, its second sensor terminal, wherein its controller couples its second sensor terminal to the processing circuitry in the first polarity state, and wherein its controller couples its first sensor terminal to the processing circuitry in the second polarity state;
a third switch that is coupled to its first current source, its first sensor terminal, its second sensor terminal, wherein its controller couples its first current source to its first sensor terminal in a first configuration state, and wherein its controller couples its first current source to its second sensor terminal in a second configuration state; and
a fourth switch that is coupled to its second current source, its first sensor terminal, its second sensor terminal, and its controller, wherein its controller couples its second current source to its second sensor terminal in the first configuration state, and wherein its controller couples its second current source to its first sensor terminal in the second configuration state.

16. The apparatus of claim 15, wherein the each input circuit further comprises a diode that is coupled between the second current source and ground.

17. The apparatus of claim 16, wherein the diode is a diode-connected transistor.

18. The apparatus of claim 16, wherein the apparatus further comprises latching circuitry that is coupled between the mapping circuitry and the digital comparator.

19. The apparatus of claim 16, wherein the processing circuitry further comprises an ADC.

20. The apparatus of claim 19, the plurality of sensors further comprises a plurality of diodes-connected transistors.

* * * * *